United States Patent
Klees

(10) Patent No.: US 7,380,800 B2
(45) Date of Patent: Jun. 3, 2008

(54) METHOD AND SYSTEM FOR CONTROLLING A DUAL MODE VEHICLE SUSPENSION SYSTEM

(75) Inventor: Gerard Klees, Oxford, MI (US)

(73) Assignee: Chrysler LLC, Auburn Hills, MI (US)

( * ) Notice: Subject to any disclaimer, the term of this patent is extended or adjusted under 35 U.S.C. 154(b) by 398 days.

(21) Appl. No.: 11/154,682

(22) Filed: Jun. 16, 2005

(65) Prior Publication Data

US 2006/0284387 A1    Dec. 21, 2006

(51) Int. Cl.
*B60G 17/0165* (2006.01)

(52) U.S. Cl. ............................... 280/5.519; 280/5.515; 701/38

(58) Field of Classification Search ................. 280/5.5, 280/5.514–5.519; 701/38
See application file for complete search history.

(56) References Cited

U.S. PATENT DOCUMENTS

| | | | | |
|---|---|---|---|---|
| 3,552,767 | A | | 1/1971 | Yew et al. |
| 4,564,215 | A | * | 1/1986 | Kumagai et al. ......... 280/5.519 |
| 4,598,929 | A | * | 7/1986 | Kumagai et al. ......... 280/5.513 |
| 4,629,212 | A | * | 12/1986 | Takizawa et al. ......... 280/5.519 |
| 5,124,917 | A | * | 6/1992 | Kanamori ................... 701/37 |
| 5,193,844 | A | * | 3/1993 | Butsuen et al. .......... 188/266.4 |
| 5,217,245 | A | * | 6/1993 | Guy .................... 280/124.152 |
| 5,487,006 | A | * | 1/1996 | Kakizaki et al. ............... 701/38 |
| 6,176,494 | B1 | * | 1/2001 | Ichimaru et al. ......... 280/5.515 |
| 6,202,011 | B1 | * | 3/2001 | Jeon ........................... 701/37 |
| 6,532,407 | B1 | * | 3/2003 | Fuhrer et al. ................. 701/38 |
| 6,575,484 | B2 | | 6/2003 | Rogala et al. |
| 6,859,703 | B2 | * | 2/2005 | Fuhrer et al. ................. 701/38 |
| 7,040,632 | B2 | * | 5/2006 | Burdock et al. ......... 280/5.515 |
| 2002/0138186 | A1 | * | 9/2002 | Kim ........................... 701/37 |
| 2003/0189300 | A1 | * | 10/2003 | Burdock .................. 280/5.515 |
| 2004/0113377 | A1 | | 6/2004 | Klees |
| 2006/0192354 | A1 | * | 8/2006 | Van Cayzeele .......... 280/5.506 |

\* cited by examiner

*Primary Examiner*—Ruth Ilan
*Assistant Examiner*—Drew J. Brown
(74) *Attorney, Agent, or Firm*—Ralph E. Smith

(57) ABSTRACT

A method and system for controlling a vehicle suspension system switchable between two modes of operation, including a first mode for when the vehicle is experiencing an on-road driving condition and a second mode for when the vehicle is experiencing an off-road driving condition, includes a vehicle speed sensor for sensing a speed of the vehicle and generating a vehicle speed signal, which may be an inherent part of the vehicle required for other vehicle functions, such as ABS, speed, or other control. The system also includes a controller for detecting an off-road driving condition and comparing the vehicle speed signal to a predetermined speed threshold. The controller then controls the suspension system to switch to the second mode of operation upon detecting the off-road driving condition and the vehicle speed signal being less than the predetermined speed threshold.

12 Claims, 3 Drawing Sheets

METHOD AND SYSTEM FOR CONTROLLING A DUAL MODE VEHICLE SUSPENSION SYSTEM

STATEMENT REGARDING FEDERALLY SPONSORED RESEARCH OR DEVELOPMENT

This invention was made with Government support under contract number DAAE 07-03-3L001 issued by the Department of Defense. The government has certain rights in this invention.

FIELD OF THE INVENTION

The present invention relates to vehicle suspension systems, and more particularly to controlling a vehicle suspension system switchable between two operating configurations, such as on-road and off-road configurations.

BACKGROUND OF THE INVENTION

Conventional front suspension systems, such as found in light and medium duty pickup trucks, are typically comprised of steel coil springs, shock absorbers, steel roll stabilizer bar, and a 5-bar linkage, or similar arrangement. The rear suspension is typically comprised of steel multi-leaf springs and shock absorbers, or similar arrangement.

While such suspension configurations have very acceptable on-road performance for conventional light and medium pickup trucks, their off-road mobility is hampered by the relative lack of axle roll or tramp articulation when traversing uneven terrain. The front stabilizer bar stiffness and the rear leaf spring stiffness prevent the axles from achieving full tramp movement from the jounce travel limit to the rebound travel limit alternatively side to side, resulting in loss of ground contact when one wheel is traversing a large obstacle, such as a rock or boulder.

For maximum mobility and control over sand, snow, low friction surfaces, and rugged off-road terrain, it is desirable to maintain ground contact with all four tires at all times. Increasing the front and rear axle tramp compliance increases the ability of the tires to maintain ground contact under off-road conditions. However, increasing axle compliance by reducing the axle tramp stiffness to achieve more favorable off-road axle articulation and mobility is limited by deteriorated ride and handling characteristics when the vehicle is driven at higher speeds on normal road surfaces. Off-road mobility is further inhibited by the reduction in ground clearance which occurs when the vehicle is loaded.

Thus, a dual mode suspension system that provides the ability to alter suspension characteristics to optimize off-road mobility while maintaining the desired suspension characteristics for on-road driving conditions is advantageous. A dual mode suspension system consists of two operating modes, in the present embodiment, an on-road driving mode and an off-road driving mode. The on-road driving mode is configured to provide the desired roll stiffness, ride stiffness, and front to rear roll couple distribution for on-road driving. For the off-road driving mode, the system is reconfigured to provide the desired lower front and rear roll (or tramp) stiffness and increased tramp compliance, resulting in greater axle articulation for off-road driving. A dual mode suspension may also be utilized for other vehicle applications where two different suspension characteristics are desired, such as one mode for normal driving with ride quality optimized, and the other mode for more responsive handling, with firmer suspension settings.

However, there is a need for a mechanism for switching to the appropriate suspension mode in a dual mode suspension system. One possibility is to provide a manually activated switch accessible by a driver of the vehicle. However, this mechanism requires action and knowledge by the driver as to which mode to engage and when to do so, which could result in inappropriate vehicle ride and handling characteristics.

Another method for switching to the off-road driving mode may involve automatically doing so when the vehicle is placed into a four-wheel drive mode. However, this method requires the driver to affirmatively shift into four-wheel drive mode when driving off-road to activate the off-road driving mode and the off-road driving mode would never be activated when driving in an off-road condition while in two-wheel drive.

Thus, there exists a need for automatically shifting between an on-road driving mode and an off-road driving mode under appropriate circumstances without any undesirable consequences.

SUMMARY OF THE INVENTION

It is an object of the present invention to provide a method for controlling a vehicle suspension system that is switchable between two modes of operation, including a first mode for when the vehicle is experiencing an on-road driving condition and a second mode for when the vehicle is experiencing an off-road driving condition. The method includes sensing a speed of the vehicle and generating a vehicle speed signal and detecting an off-road driving condition. The method also includes comparing the vehicle speed signal to a predetermined speed threshold and controlling the suspension system to switch to the second mode of operation upon detecting the off-road driving condition when the vehicle speed signal is less than the predetermined speed threshold.

It is also an object of the present invention to provide a system for controlling a vehicle suspension system that is switchable between two modes of operation, including a first mode for when the vehicle is experiencing an on-road driving condition and a second mode for when the vehicle is experiencing an off-road driving condition. The system includes a vehicle speed sensor for sensing a speed of the vehicle and generating a vehicle speed signal. The system also includes a controller, coupled to the vehicle speed sensor, for detecting an off-road driving condition and comparing the vehicle speed signal to a predetermined speed threshold. The controller is further operative to control the suspension system to switch to the second mode of operation upon detecting the off-road driving condition and the vehicle speed signal being less than the predetermined speed threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
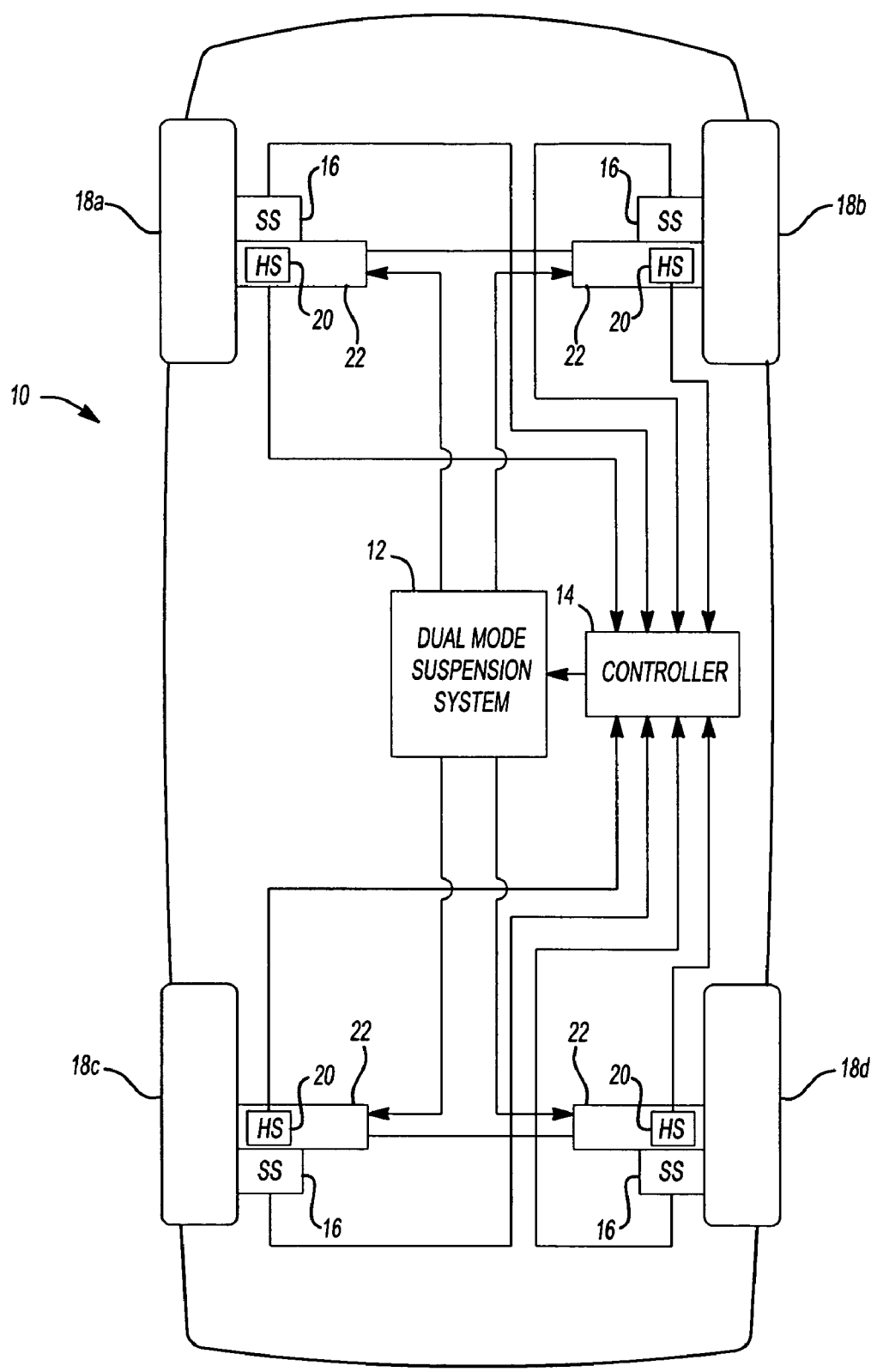
FIG. 1 is a functional block drawing of the preferred embodiment of the dual mode vehicle suspension system controller of the present invention.
Figure 2:
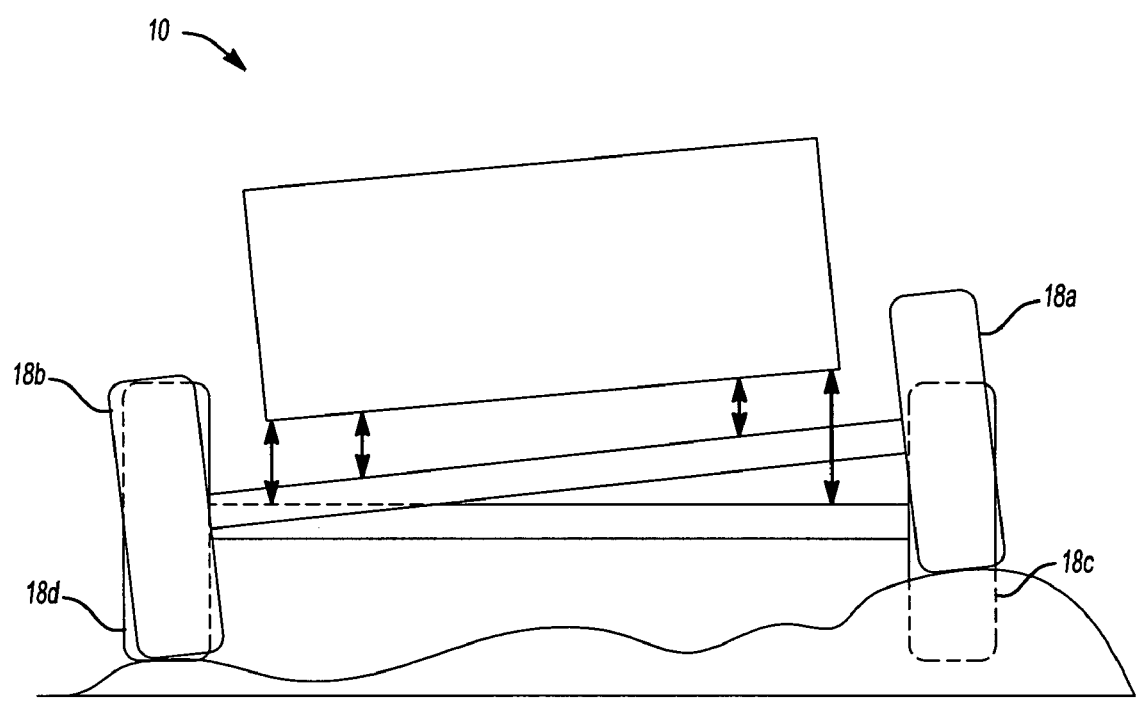
FIG. 2 is a schematic representation of the dual mode vehicle suspension system in an off-road driving condition.

Referring to FIGS. 1-2, a vehicle 10 is shown having a dual mode suspension system 12 consisting of two operating modes: on-road and off-road. The on-road mode is configured to provide the desired roll stiffness, ride stiffness, and front to rear roll couple distribution for on-road driving; for the off-road mode, the system is re-configured to provide the desired lower front and rear roll (or tramp) stiffness and increased tramp compliance, resulting in greater axle articulation for off-road driving. The dual mode suspension system 12 may be a hydro-pneumatic system, a pneumatic (i.e., air springs), or other type of suspension. The dual mode suspension system illustrated in FIG. 1 is controlled according to the present invention to switch automatically between the on-road and off-road configurations.

The system of the present invention includes a controller 14 for automatically switching the dual mode suspension system 12 from the on-road driving mode to the off-road driving mode by sensing when the vehicle 10 is being driven in off-road conditions. The controller 14 does this by sensing the speed of the vehicle, preferably by utilizing the speed signal that is otherwise generated for other vehicle functions and which is typically an input to the engine or body electronic control module 14. The speed signal may be obtained via wheel speed sensors 16 coupled to each of the wheels 18, including a left front wheel 18a, a right front wheel 18b, a left rear wheel 18c and a right rear wheel 18d.

If the vehicle speed is less than a predetermined threshold, e.g., 10 mph, the controller 14 examines the vertical displacements of each of the wheels 18 to determine if the vehicle is in an off-road driving condition, as shown in FIG. 2. Thus, coupled between each of the wheels 18 and the controller 14 are height sensors 20. If the differences between the front side to side vertical wheel displacement and the rear side to side vertical wheel displacement each exceed a predetermined displacement threshold, and the front to rear wheel displacements are out of phase, an off-road driving condition is detected. If this condition persists for more than a predetermined amount of time, then the controller 14 will operate to switch the dual mode suspension system 12 to the off-road mode. The presence of these conditions indicate the presence of alternate (i.e., tramp) displacements of relatively slow duration and large amplitude which occur only in off-road terrain. Evaluations of the magnitude of the vertical wheel displacement and time duration have indicated that wheel displacement values from 5 to 50 mm and time duration values from 0.1 to 3 seconds have provided the desired operating characteristics for indicating off-road driving conditions.

In the preferred embodiment, the dual mode suspension system 12 is a hydro-pneumatic system having hydraulic struts 22 coupled to the wheels 18. In this preferred embodiment, the height sensors 20 are located within each strut 22 and are preferably magneto-restrictive sensors. The height sensors 20 provide a voltage output to the controller 14 that is proportional to the position of a magnet (not shown) attached to the piston (not shown) of the strut 22. The position of the piston is an indication of the suspension position and the ride height of the vehicle 10. Alternatively, the height sensors 20 could be located outside the struts 22 and be attached to the suspension linkage (not shown) in a manner that provides a voltage signal proportional to wheel position.

After the off-road driving condition is met, the off-road mode is engaged until either the speed exceeds the predetermined speed threshold or the ignition (not shown) of the vehicle 10 is turned off and would not be re-activated until the off-road condition recurs.

Figure 3:
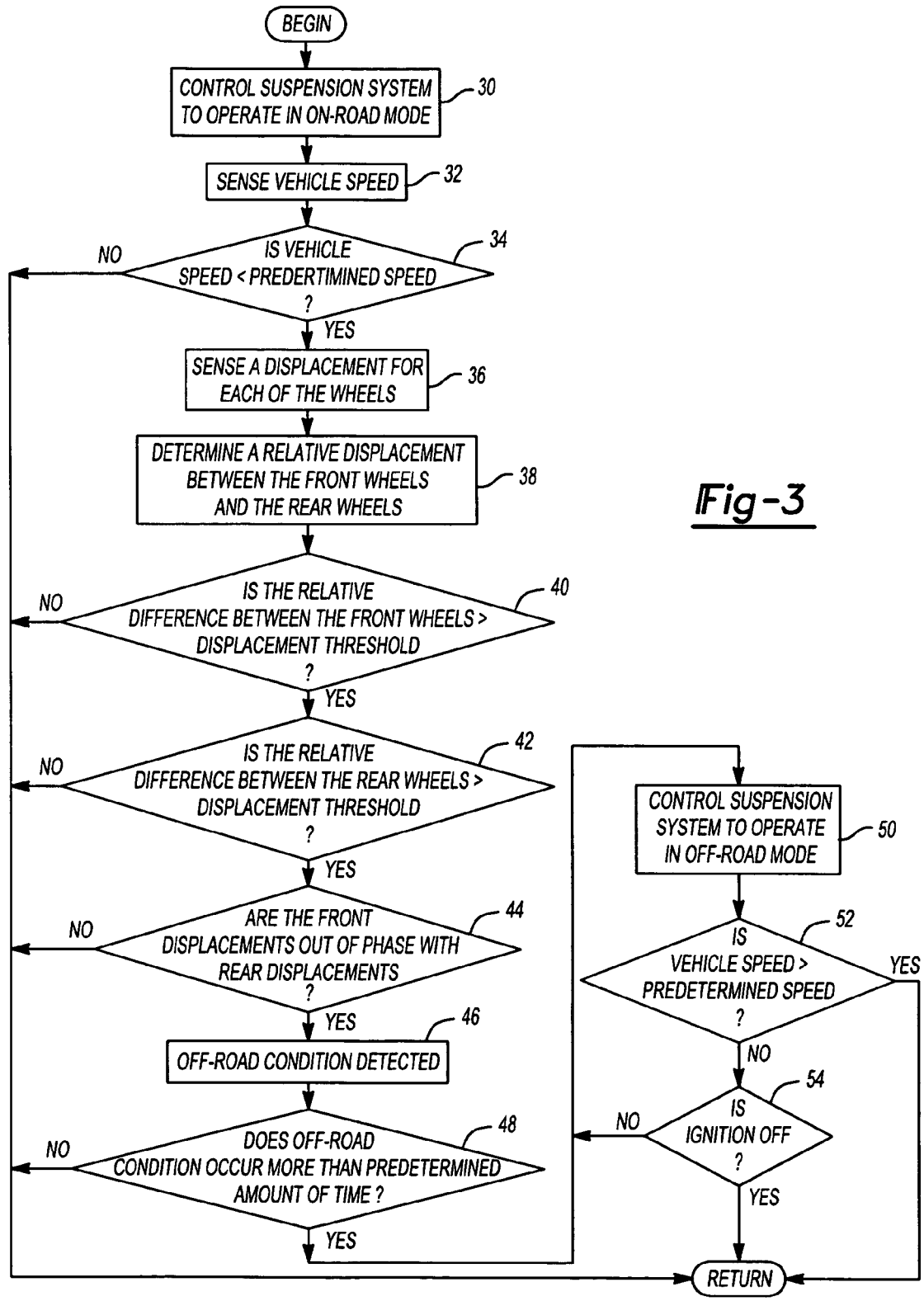
FIG. 3 is a flowchart illustrating the steps performed by the system of the present invention.

The operation of the invention will be described more fully with reference to FIG. 3. Beginning at step 30, the method begins by controlling the dual mode suspension 12 to operate in the on-road mode initially at ignition on. The vehicle speed is then sensed, step 32, and compared to the predetermined speed threshold, step 34. If the speed is greater than the predetermined speed threshold, the method returns to the start and continues with the dual mode suspension system 12 operating in the on-road mode.

If the speed is less than the predetermined speed threshold, the method proceeds to sensing a displacement for each of the wheels 18, as shown at step 36. For example, if the normal vertical displacement for the wheels 18 when driving on-road is 125 mm, if the vehicle 10 is driving off-road, the vertical displacement will vary, either above or below the 125 mm.

Next, a relative displacement between the front wheels 18a, 18b is determined as well as a relative displacement between the rear wheels 18c, 18d, as shown at step 38. For example, if driving off-road, the left front wheel 18a may experience a vertical displacement of +137 mm, while the right front wheel 18b may experience a vertical displacement of −113 mm, thereby having a relative displacement of 24 mm between the two wheels 18a, 18b. Similarly, the left rear wheel 18c may experience a vertical displacement of −113 mm, while the right rear wheel 18d may experience a vertical displacement of +137 mm, thereby having a relative displacement of 24 mm between the two wheels 18c, 18d.

Each of the front and rear relative differences is then compared to a predetermined displacement threshold, steps 40 and 42. For example, if the displacement threshold is 12 mm, the front and rear relative displacement differences both exceed the predetermined threshold and continue to step 44. If either of the front or rear relative displacement differences did not exceed the predetermined displacement threshold, the method would continue to allow the dual mode suspension system 12 to operate in the on-road mode.

Returning to step 44, the method continues to determine if the front displacements are out of phase with the rear displacements, which would indicate the vehicle 10 traveling on rugged off-road terrain. In other words, if the left front wheel 18a moves up in relation to the right front wheel 18b, then the left rear wheel 18c must move down in relation to the right rear wheel 18d if an off-road condition is to be detected, step 46.

If this off-road condition occurs for more than a predetermined amount of time, e.g., 1.5 seconds, the controller 14 would then operate to cause the dual mode suspension system 12 to switch to the off-road mode, as shown at block 50. If not, the method returns to the on-road mode.

Once the off-road mode condition exists for the predetermined amount of time, it will remain in this mode, even if the alternate input condition is removed, until the vehicle speed exceeds the predetermined speed threshold, step 52, or the ignition is turned off, step 54. If either one of these conditions are met, the controller 14 would then cause the dual mode suspension system 12 to switch back to the on-road mode until the off-road condition is detected again.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling a suspension system of a vehicle having a plurality of wheels including left and right front wheels and left and right rear wheels, the suspension system switchable between two modes of operation, including a first mode for when the vehicle is experiencing an on-road driving condition and a second mode for when the vehicle is experiencing an off-road driving condition, the method comprising:
   sensing a speed of the vehicle and generating a vehicle speed signal;
   detecting an off-road driving condition including
      sensing a front displacement for each of the front wheels;
      sensing a rear displacement for each of the rear wheels;
      determining whether the front displacements of the front wheels are out of phase with the rear displacements of the rear wheels; and
      detecting the off-road driving condition based on the front displacements being out of phase with the rear displacements;
   comparing the vehicle speed signal to a predetermined speed threshold; and
   controlling the suspension system to switch to the second mode of operation upon detecting the off-road driving condition and the vehicle speed signal being less than the predetermined speed threshold.

2. The method as recited in claim 1 wherein controlling the suspension system to switch to the second mode of operation further comprises determining if the off-road driving condition occurs for more than a predetermined amount of time.

3. The method as recited in claim 1 wherein detecting the off-road driving condition based on the front and rear displacements of the front and rear wheels, respectively, further comprises:
   determining a front relative displacement between the front displacements;
   determining a rear reactive displacement between the rear displacements;
   determining if the front relative displacement and the rear relative displacement exceeds a predetermined displacement threshold; and
   upon determining that the front rear relative displacements exceed the predetermined threshold, then detecting the off-road driving condition based on the front displacements being out of phase with the rear displacements.

4. The method as recited in claim 1 further comprising:
   sensing a predetermined event; and
   controlling the suspension system to switch to the first mode of operation upon detecting the predetermined event.

5. The method as recited in claim 4 wherein the predetermined event is ignition off.

6. The method as recited in claim 4 wherein the predetermined event occurs when the vehicle speed signal exceeds the predetermined speed threshold.

7. A system for controlling a suspension system of a vehicle having a plurality of wheels including left and right front wheels and left and right rear wheels, the suspension system switchable between two modes of operation, including a first mode for when the vehicle is experiencing an on-road driving condition and a second mode for when the vehicle is experiencing an off-road driving condition, the system comprising:
   a vehicle speed sensor for sensing a speed of the vehicle and generating a vehicle speed signal;
   a height sensor coupled to each of the wheels for sensing a front displacement of each of the front wheels and a rear displacement for each of the rear wheels; and
   a controller coupled to the height sensors operative to:
      detect an off-road driving condition by determining whether the front displacements of the front wheels are out of phase with the rear displacements of the rear wheels and detecting the off-road driving condition based the front displacements being out of phase with the rear displacements,
      compare the vehicle speed signal to a predetermined speed threshold, and
      control the suspension system to switch to the second mode of operation upon detecting the off-road driving condition and the vehicle speed signal being less than the predetermined speed threshold.

8. The system as recited in claim 7 wherein the controller, in controlling the suspension system to switch to the second mode of operation, is further operative to determine if the off-road driving condition occurs for more than a predetermined amount of time.

9. The system as recited in claim 7 wherein the controller, in detecting the off-road driving condition based on the front and rear displacements of the front and rear wheels, respectively, is further operative to:
   determine a front relative displacement between the front displacements;
   determine a rear relative displacement between the rear displacements;
   determine if the front relative displacement and the rear relative displacement exceeds a predetermined displacement threshold; and
   the controller upon determining that the front and rear relative displacements exceed the predetermined threshold, then detecting the off-road driving condition upon determining that the front displacements are out of phase with the rear displacements.

10. The system as recited in claim 7 wherein the controller is further operative to:
    sense a predetermined event; and
    control the suspension system to switch to the first mode of operation upon detecting the predetermined event.

11. The system as recited in claim 10 wherein the predetermined event is ignition off.

12. The system as recited in claim 10 wherein predetermined event occurs when the vehicle speed signal exceeds the predetermined speed threshold.

* * * * *